United States Patent
Joo

(10) Patent No.: US 7,774,005 B2
(45) Date of Patent: Aug. 10, 2010

(54) SYSTEM AND METHOD FOR SENDING SHORT TEXT MESSAGES IN MOBILE COMMUNICATION SYSTEMS

(75) Inventor: Sin-Young Joo, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 978 days.

(21) Appl. No.: 11/249,971

(22) Filed: Oct. 13, 2005

(65) Prior Publication Data

US 2006/0135185 A1    Jun. 22, 2006

(30) Foreign Application Priority Data

Dec. 17, 2004    (KR) .................. 10-2004-0108274

(51) Int. Cl.
*H04W 4/00* (2009.01)
(52) U.S. Cl. .................................. 455/466
(58) Field of Classification Search .............. 455/466, 455/412.1, 414.1, 419, 420, 445
See application file for complete search history.

(56) References Cited

U.S. PATENT DOCUMENTS

| | | | |
|---|---|---|---|
| 6,151,507 A | 11/2000 | Laiho et al. | |
| 2003/0110212 A1 | 6/2003 | Lewis | |
| 2005/0010573 A1* | 1/2005 | Garg | 707/10 |
| 2005/0198353 A1* | 9/2005 | Zmrzli | 709/232 |
| 2006/0148495 A1* | 7/2006 | Wilson | 455/466 |

FOREIGN PATENT DOCUMENTS

| | | |
|---|---|---|
| EP | 1 322 126 | 6/2003 |
| GB | 2 390 956 | 1/2004 |
| KR | 1020030058778 | 7/2003 |
| WO | WO03019959 A1 * | 3/2003 |
| WO | WO 2004/025977 | 3/2004 |

* cited by examiner

*Primary Examiner*—Joseph H Feild
*Assistant Examiner*—Huy D Nguyen
(74) *Attorney, Agent, or Firm*—The Farrell Law Firm, LLP

(57) ABSTRACT

Disclosed are a system and a method for sending a short text message to both a mobile phone and a mail server. The system includes at least one base station for providing wireless network nodes of the first and second mobile phones; a short message service center for receiving a short message from the first mobile phone and sending the received short message to both the second mobile phone and an email address of a subscriber having the second mobile phone, if the email address is included in the received short message; and at least one mobile switching center for delivering a request for sending a short message which has been received from the first mobile phone to the short message service center and sending the short message to the second mobile phone upon receiving an instruction to send the short message from the short message service center.

9 Claims, 9 Drawing Sheets

SYSTEM AND METHOD FOR SENDING SHORT TEXT MESSAGES IN MOBILE COMMUNICATION SYSTEMS

PRIORITY

This application claims priority to an application entitled "System and Method for Sending Short Text Messages in Mobile Communication System" filed with the Korean Intellectual Property Office on Dec. 17, 2004 and assigned Serial No. 2004-108274, the contents of which are incorporated herein by reference.

BACKGROUND OF THE INVENTION

1. Field of the Invention

The present invention relates to a system and method for sending short text messages, and more particularly to a system and method for sending short text messages in a mobile communication system.

2. Description of the Related Art

Due to the innovative development of network technologies, various messaging services, including SMS (Short Message Service), MMS (Multimedia Messaging Service) and email, have become available on mobile phones. Mobile subscribers generally use SMS to exchange short text messages and wireless Internet service to exchange information via the Internet.

When a short text message is sent using SMS, the recipient's mobile phone can receive the short text message through a public switched telephone network or a data communication network including the Internet.

SMS is generally used by two methods. The first is to send a message to an intended recipient's mobile phone by accessing the Internet through a computer. The second uses mobile phones.

The SMS service is available only to mobile subscribers with their own mobile phones. SMS messages can be received even during a voice call over a mobile phone. If there is a message received while the mobile phone is off, a short message service center (SMSC) temporarily stores the message data When the recipient's mobile phone is turned on and registers its location at the network, it can then receive the stored message from the SMSC. In addition, with the SMS service, the subscribers can receive information, such as stock quotes and weather forecasts, or use Internet banking services and e-commerce.

If a subscriber does not use a roaming service or cannot turn on his or her mobile phone while traveling abroad, he or she cannot read messages sent to the phone. Even while roaming in a foreign country, the subscriber cannot read any received text message if the language used in the message is not supported by the foreign mobile phone network.

When a short text message is sent as email, it is transferred to the recipient's email address through a service provider network and then through the Internet. In such a case, the message sender is charged for email.

As disclosed in EP 132126, mobile subscribers may register their email addresses at a mobile service provider server (for example, a home location register) if they wish to receive short text messages as both email and SMS. When a short text message is delivered, the short message service center (SMSC) searches the mobile service provider server to detect whether a registered email address is included in the destination address of the message, which creates overhead.

SUMMARY OF THE INVENTION

Accordingly, the present invention has been made to solve the above-mentioned problems occurring in the prior art, and an object of the present invention is to provide a system and method for sending a short text message to both a mobile phone and a mail server.

Another object of the present invention is to provide a system and method for sending a short text message to both a mobile phone and a mail server at an SMS cost only.

In accordance with a first aspect of the present invention for accomplishing the above objects, there is provided a mobile communication system for sending short text messages from a mobile communication network providing an SMS service to at least one first mobile phone to a different or identical mobile communication network providing the SMS service to at least one second mobile phone, which includes at least one base station for providing wireless network nodes of the first and second mobile phones; a short message service center for receiving a short message from the first mobile phone and sending the received short message to both the second mobile phone and an email address of a subscriber having the second mobile phone, if the email address is included in the received short message; and at least one mobile switching center for delivering a request for sending a short message which has been received from the first mobile phone to the short message service center and sending the short message to the second mobile phone upon receiving an instruction to send the short message from the short message service center.

In accordance with a second aspect of the present invention, there is provided a mobile communication system for sending short text messages from a mobile communication network providing an SMS service to at least one first mobile phone to a different or identical mobile communication network providing the SMS service to at least one second mobile phone, wherein said first mobile phone includes a short message sending device including a message input section for inputting a short text message including a telephone number of the second mobile phone and an email address of a subscriber having the second mobile phone; an encoder for encoding the inputted short text message in an SMS format; and a control section for controlling the message input section to input the short text message and the encoder to encode the inputted short text message in the SMS format and sending the encoded short text message to a short message service center.

In accordance with a third aspect of the present invention, there is provided a method for sending short text messages from a mobile communication network providing an SMS service to at least one first mobile phone to a different or identical mobile communication network providing the SMS service to at least one second mobile phone in a mobile communication system, wherein a process of sending a short message from the first mobile phone includes when a menu for simultaneous SMS and email services is selected on the first mobile phone, inputting a short message including a telephone number of the second mobile phone and an email address of a subscriber having the second mobile phone; encoding the inputted short message in an SMS format; and sending the encoded short message to a short message service center.

In accordance with a fourth aspect of the present invention, there is provided a method for sending short text messages from a mobile communication network providing an SMS service to at least one first mobile phone to a different or identical mobile communication network providing the SMS service to at least one second mobile phone in a mobile communication system, wherein a process of delivering a short message from a short message service center includes when the short message service center receives a short message from the first mobile phone, searching a header of the received short message; determining whether the header includes an email address of a subscriber having the second mobile phone; and when the header includes an email address, sending the short message to both the second mobile phone and the email address included in the header.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention unclear.

According to the present invention, a short text message is delivered to an SMSC (Short Message Service Center) from a sender's mobile phone. The SMSC transfers the received short message to a recipient's mobile phone or to both the recipient's mobile phone and a mail server. A short message field includes a destination address field recording the recipient's mobile phone number, a destination sub-address field recording an email address of the recipient, and a message content field. Based on the information in the destination sub-address field, the SMSC transfers the received short message to both the recipient's mobile phone and the mail server. The destination sub-address field is a sub-address field which is not currently used. When receiving a short message including an email address in the destination sub-address field, the SMSC transfers the received short message to the recipient's mobile phone and the mail server simultaneously.

Figure 1:
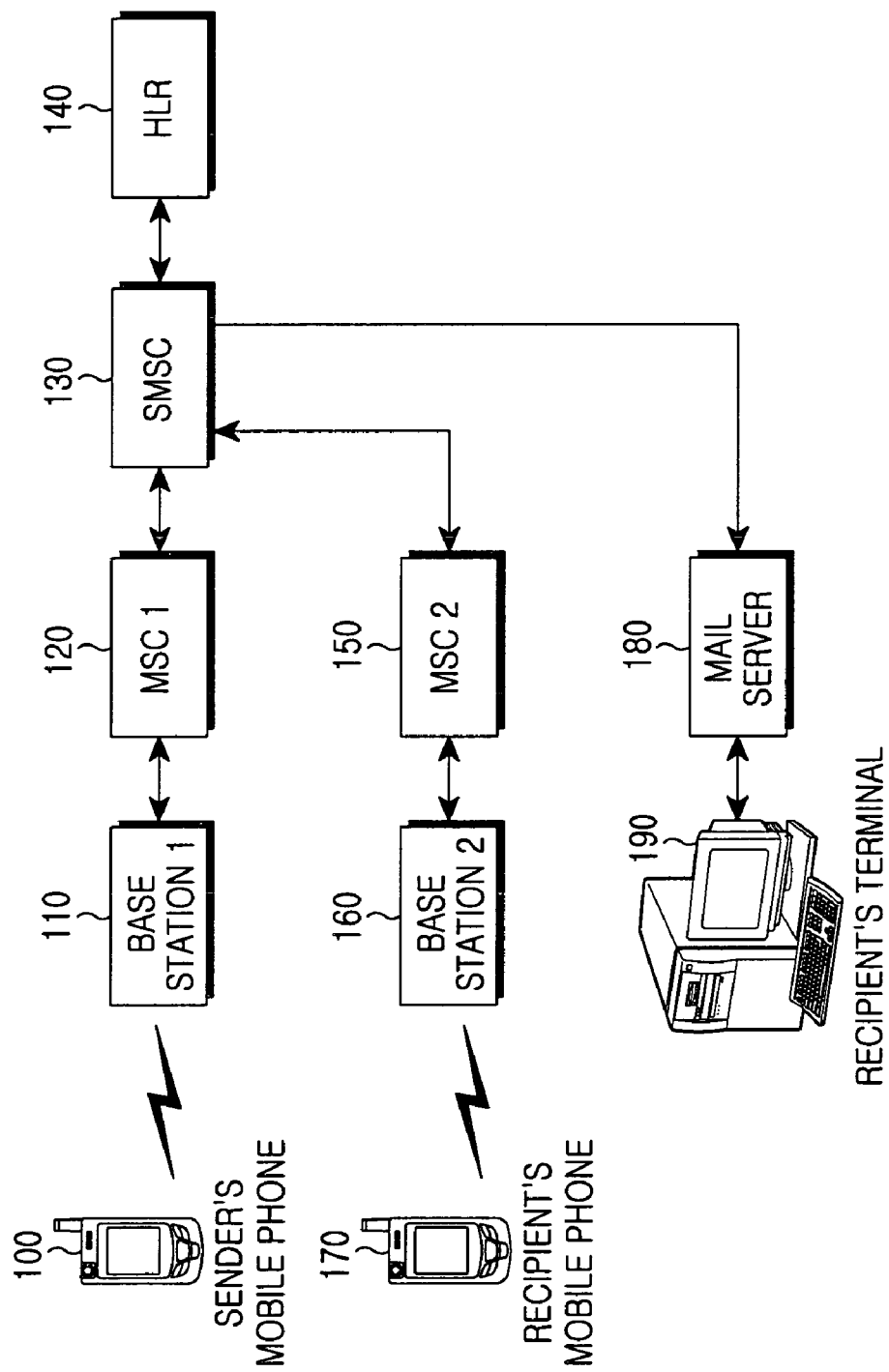
FIG. 1 is a block diagram of a system for sending short text messages in a mobile communication system according to an embodiment of the present invention.

FIG. 1 is a block diagram of a system for sending short messages in a mobile communication system according to the present invention. The short message sending system includes a sender's mobile phone 100, a recipient's mobile phone 170, a sender's terminal 190, first and second base stations 110 and 160, first and second mobile switching centers ("MSCs") 120 and 150, a short message service center ("SMSC") 130, a home location register ("HLR") 140 and a mail server 180.

A mobile communication network comprising the MSC 120 (or 150) and the base station 110 (or 160) serves as an interface between the SMSC 130 and the sender's mobile phone 100 (or the recipient's mobile phone 170). The base stations 110 and 160 provide wireless network nodes of the sender's mobile phone 100 and the recipient's mobile phone 170. When receiving a request for sending a short message from the sender's mobile terminal 100, the first MSC 120 delivers the request to the SMSC 130. The second MSC 150 sends the short message to the recipient's mobile phone 170 upon receipt of an instruction to send the short message from the SMSC 130.

The sender's mobile phone 100 can send a short message by accessing the mobile communication network through a base transceiver subsystem ("BTS") and a base station controller ("BSC") (FIG. 1 depicts the base station 1 incorporating the BTS and the BSC). The first MSC 120 is connected to the sender's mobile terminal 100 and to the SMSC 130 to transfer a short message to the recipient's mobile phone 170.

The SMSC 130 is connected to the mail server 180 to transfer the short message received from the sender's mobile phone 100 to the email address of the recipient, as well as to the recipient's mobile phone 170.

The mail server 180 in FIG. 1 may be configured as a group of servers provided in a plurality of mail hosts. Preferably, the mail server 180 should be a POP3 mail server using a standard protocol for receiving email. The mail server 180 sends mail information received from the SMSC 130 to a mail account (for example, jenney@xyz000.com through an SMS (Short Message Service) bearer. After a login to the mail account on the recipient's terminal 190, the recipient can open the received short message. The recipient's terminal 190 can be a desktop or notebook computer capable of accessing the Internet.

The structure of the sender's and recipient's mobile phones 100 and 170 will be explained in detail with reference to FIG. 2.

Figure 2:
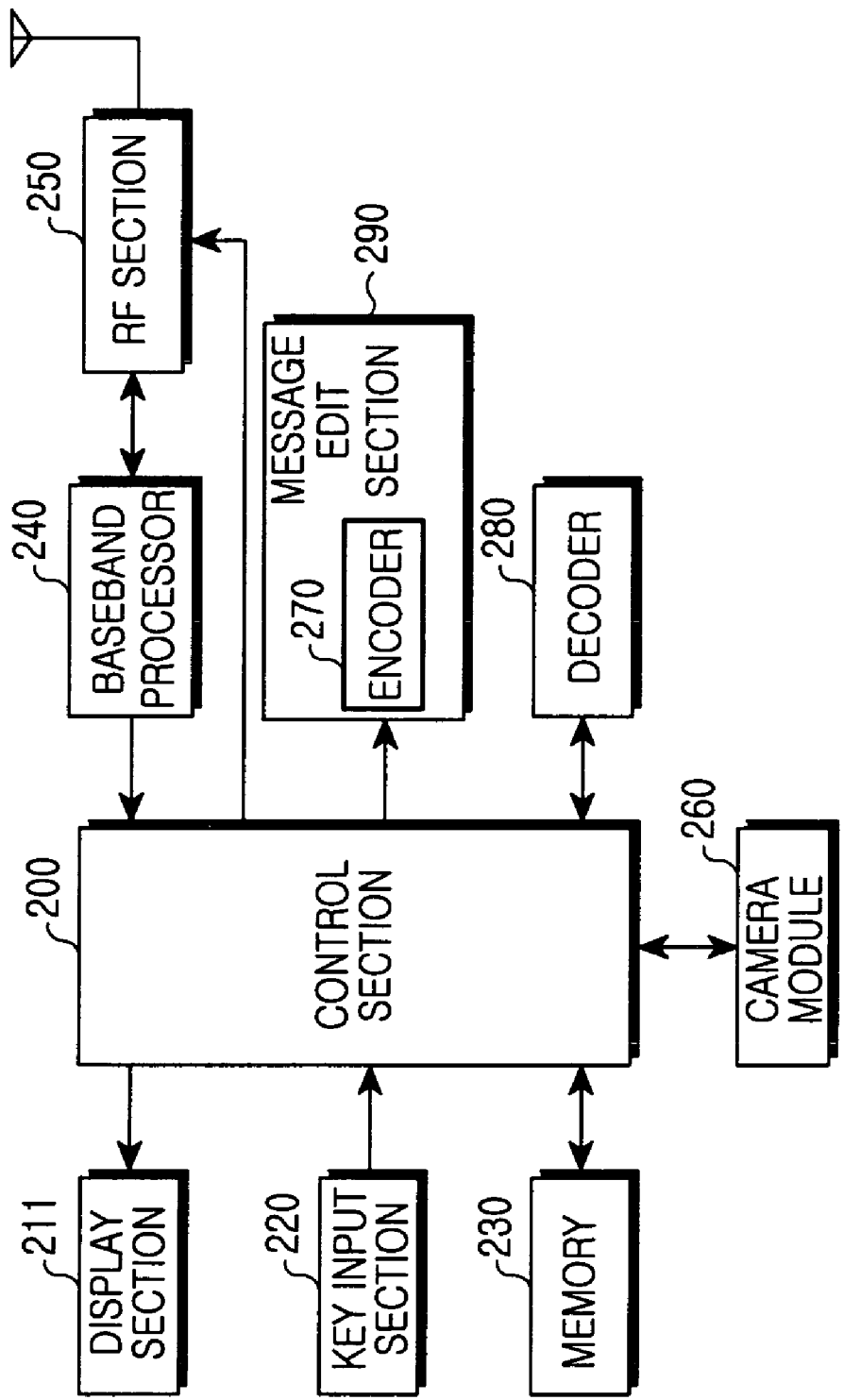
FIG. 2 is a block diagram of a mobile phone in FIG. 1.

FIG. 2 is a block diagram showing the internal structure of a mobile phone according to an embodiment of the present invention.

Referring to FIG. 2, a control section 200 controls overall operations of the mobile terminal. When a short text message is inputted, the control section 200 encodes the short message and sends it to a specified recipient's address which may include the recipient's mobile phone number or both the mobile phone number and the recipient's email address. When the short message is sent to the recipient's mobile phone 170, the control section 200 of the recipient's mobile phone 170 accesses an SMS server (not shown) to receive the short message. After checking the content field of the received short message, the control section 200 decodes the short message and stores the decoded message in a memory 230.

A display section 210 displays data corresponding to a key inputted on a key input section 220 under the control of the control section 200. The display section 210 also displays the operational state of the mobile phone and various other information using icons, short text and images. When a subscriber sets any function mode and implements the function, the display section 210 visually shows the change of mode and the implementation of function under the control of the control section 200. In addition, the display section 210 displays a window for inputting a short text message, an indication of a message sending process, an address field for inputting an intended recipient's address (i.e., the recipient's mobile phone number and/or email address) and an indication of the receipt of a short message under the control of the control section 200.

The key input section 220 with a plurality of number keys and function keys provides key input data to the control section 200. In other words, the key input section 220 outputs data corresponding to a key inputted by the subscriber and applies the data to the control section 200. The control section 200 analyzes the key input data and performs a function according to the data.

The memory 230 connected to the control section 200 consists of a ROM (Read Only Memory), a RAM (Random Access Memory) and a voice memory for storing a plurality of programs and information necessary to control operations of the mobile phone.

An RF section 250 transmits and receives RF signals to and from a base station through an antenna. The RF section 250 converts a received RF signal into an IF (intermediate frequency) signal and outputs the IF signal to a baseband processor 240. Also, the RF section 250 converts an IF signal inputted from the baseband processor 240 into an RF signal and sends the RF signal to the base station. As a BAA (Baseband Analog ASIC) that provides an interface between the control section 200 and the RF section 250, the baseband processor 240 converts a baseband digital signal applied from the control section 200 into an analog IF signal and applies the analog IF signal to the RF section 250. The baseband processor 240 converts an analog IF signal applied from the RF section 250 into a baseband digital signal and applies the digital signal to the control section 200. The baseband processor 240 plays a role in sending a short message or transferring a received short message to the control section 200.

A camera module 260 is mounted in the mobile terminal to perform a camera phone function. When a key to photograph is pressed, the control section 200 receives the key input data from the key input section 220 and thereby controls the camera function of the mobile phone.

Figure 3:
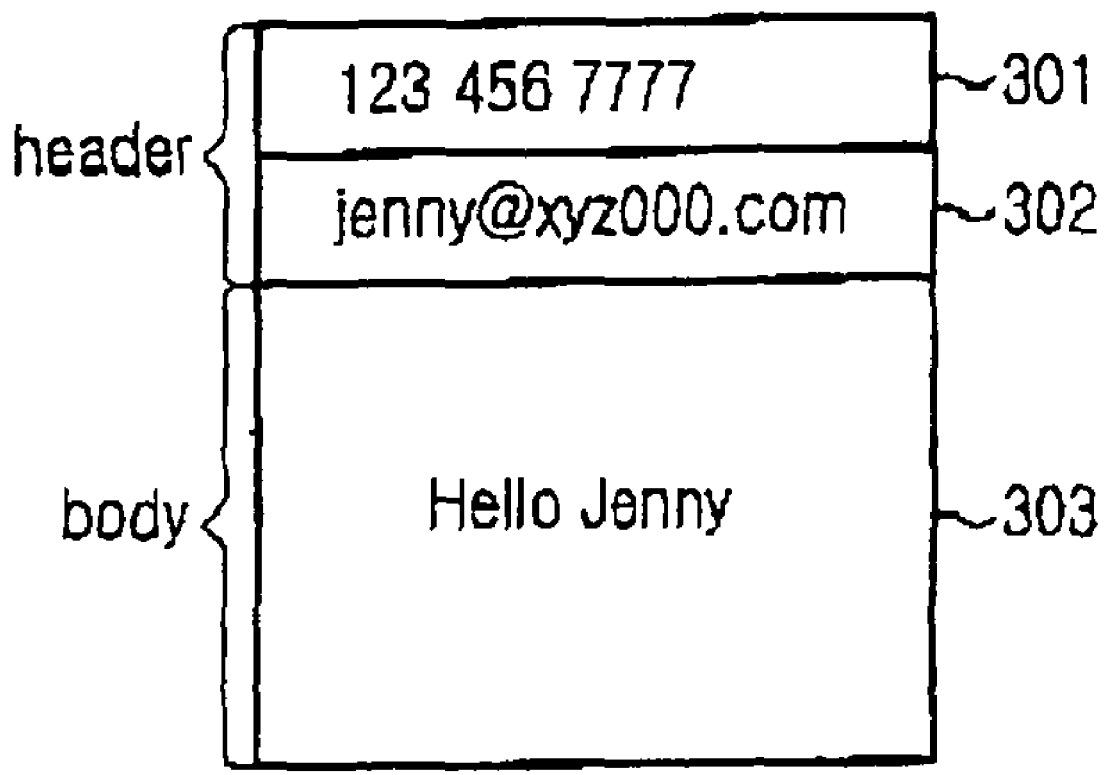
FIG. 3 is a view illustrating a short message format according to an embodiment of the present invention.

A short message is inputted in a message edit section 290 under the control of the control section 200. As shown in FIG. 3, the message edit section 290 consists of a header and a body. The header includes a destination address field 301 for inputting the recipient's mobile phone number (for example, "123 456 7777") and a destination sub-address field 302 for inputting an email address of the recipient (for example, "jenney@xyz000.com") The body includes a message content field 303 for inputting a short text message (for example, "Hello Jenny").

An encoder 270 in FIG. 2 encodes the short message inputted in the message edit section 290 in an SMS format under the control of the control section 200. A decoder 280 decodes short messages received from another subscriber's mobile phone.

Figure 4:
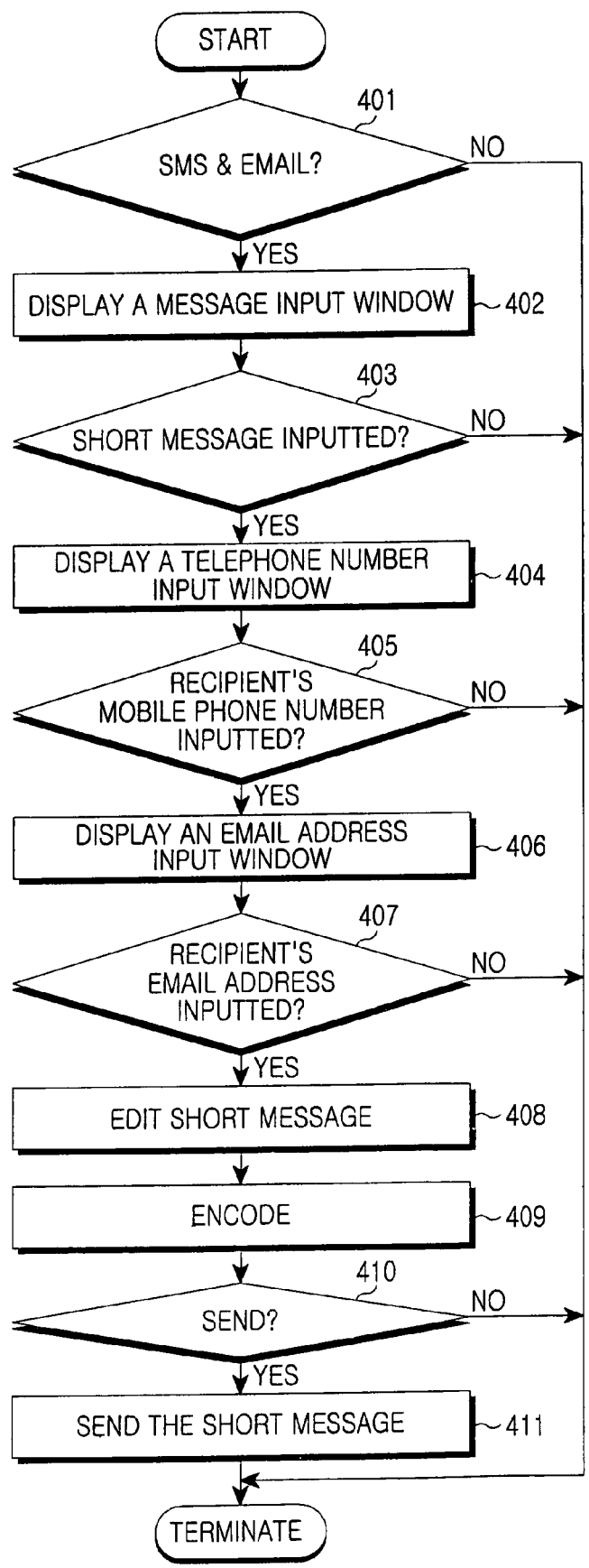
FIG. 4 is a flow chart showing a process of sending a short text message from a mobile phone in a mobile communication system according to an embodiment of the present invention.

Hereinafter, a process of sending a short message on a mobile phone according to an embodiment of the present invention will be explained in detail with reference to FIGS. 4 and 5.

Figure 5A:
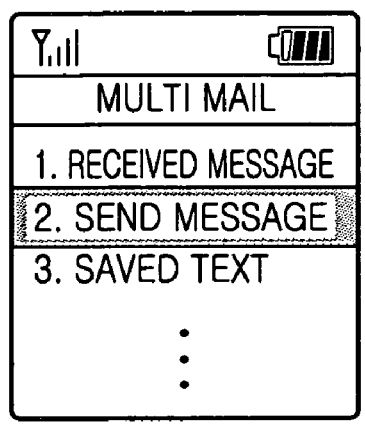
FIG. 5 is a view illustrating the displays on a mobile phone when sending a short text message according to the process in FIG. 4.
Figure 5B:
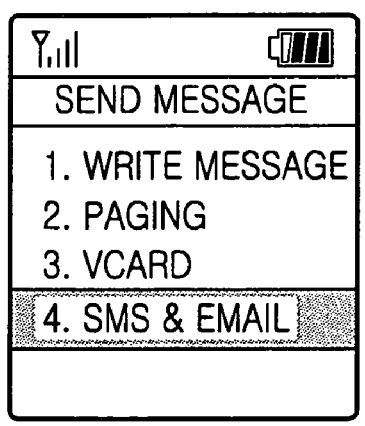
Figure 5C:
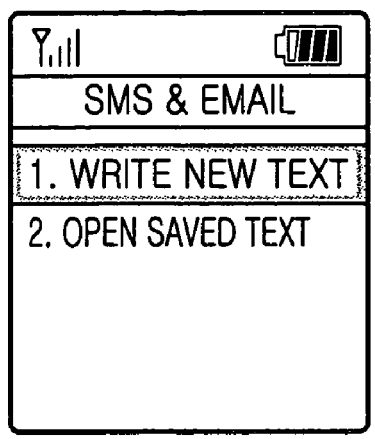
Figure 5D:
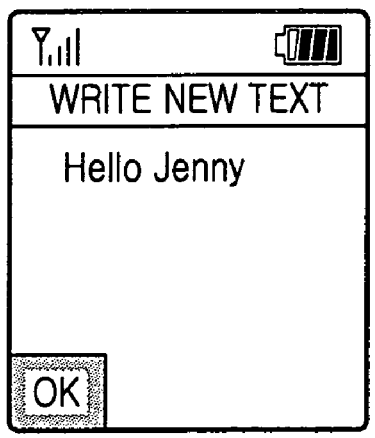
Figure 5E:
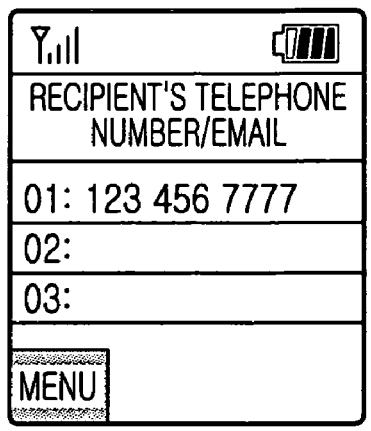
Figure 5F:
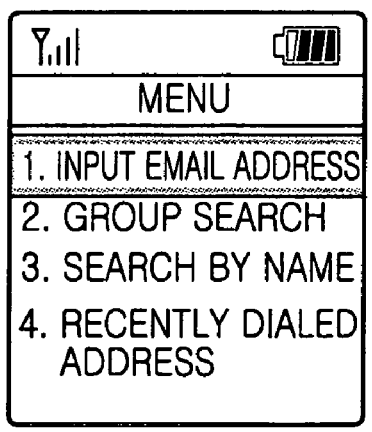
Figure 5G:
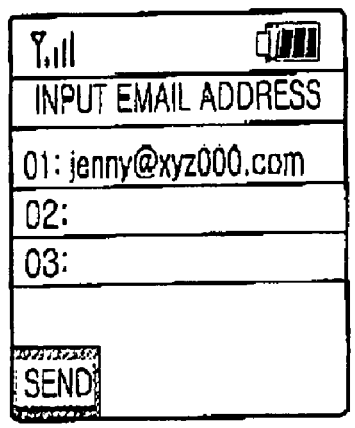
Figure 5H:
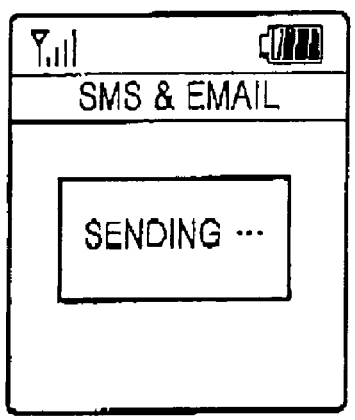

At step 401, the control section 200 determines whether an "SMS & Email" menu is selected to simultaneously send a short message to the recipient's mobile phone 170 and the mail server 180. When the subscriber selects "SMS & Email" from the menu as shown in FIG. 5(b), the control section 200 controls a display section 211 to display a message input window as shown in FIG. 5(d) at step 402. Then the control section 200 proceeds with step 403 to determine whether the subscriber has inputted a short message. At this time, the control section 200 determines whether the subscriber has completed input of the short message based on the key input data provided by the key input section 220. Upon completely inputting the short message, the control section 200 proceeds with step 404 to display a telephone number input window as shown in FIG. 5(e). When the control section 200 determines that the subscriber has completed input of the recipient's mobile phone number, it controls the display section 211 to display an email address input window as shown in FIG. 5(f) at step 406. The control section 200 determines whether the subscriber has completed input of the recipient's email address at step 407. If so, the control section 200 controls the message edit section 290 to edit the inputted short message at step 408. The encoder 270 encodes the composed short message in an SMS format at step 409 under the control of the control section 200. The control section 200 determines whether a "SEND" button is selected at step 410. Upon selection of the "SEND" button as shown in FIG. 5(g), the control section 200 forwards the short message to the recipient's mobile phone 170 at step 411. FIG. 5(h) illustrates an indication of a message sending process.

Figure 6:
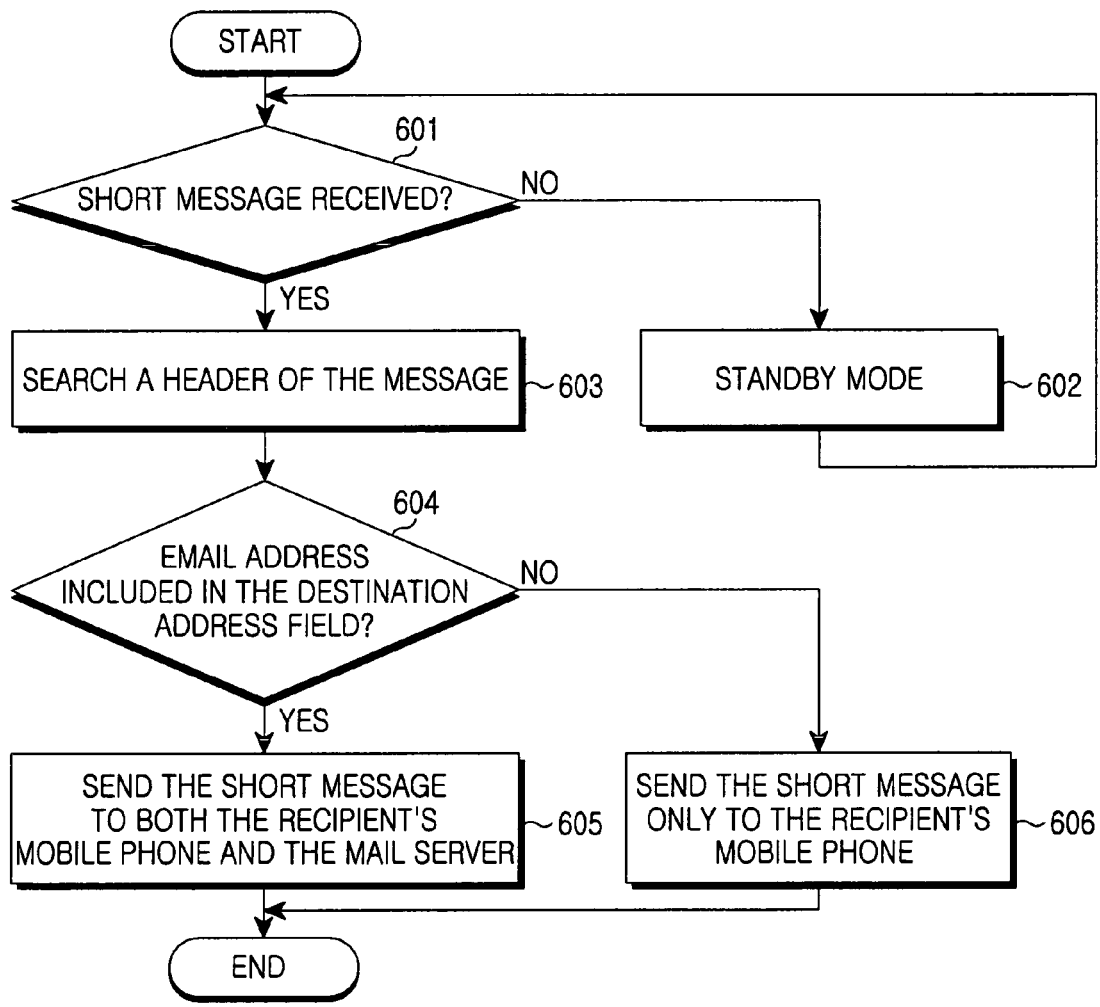
FIG. 6 is a flow chart showing a process of processing a short text message at a short message service center in a mobile communication system according to an embodiment of the present invention.

Hereinafter, the operations of the SMSC 130 for receiving the short message from the sender's mobile phone 100 and processing the received message will be explained in detail with reference to FIG. 6.

At step 601, the SMSC 130 determines whether a short message has been received from the sender's mobile phone 100. If no message is received from the sender's mobile phone 100, the SMSC 130 will proceed with step 602 to be in a standby mode of waiting for a message sent from the sender's mobile phone 100. If a short message is received, the SMSC 130 searches the header of the received short message AT STEP 603. As previously explained with reference to FIG. 3, the header includes the destination address field and the destination sub-address field. At step 603, the SMSC 130 detects whether an email address is included in the destination sub-address field. It is assumed that the destination address field includes the recipient's mobile phone number. If an email address is detected in the destination sub-address field, the SMSC 130 will send the received short message to both the recipient's mobile phone number and the mail server 180 at step 605. Otherwise, the SMSC 130 will send the received short message to the recipient's mobile phone number only at step 606.

If a short message is sent to both a recipient's mobile phone number and an email address, the recipient can read the message on a terminal connected to the Internet when he or she cannot receive the message on his or her mobile phone.

According to the described embodiments of the present invention, subscribers need only to pay for a single message, even when sending a short message to both a mobile phone and an email address.

In addition, subscribers do not need to previously register their email addresses at a mobile service provider server to receive short messages as email. The present invention reduces overhead of the SMSC by eliminating the need to search the mobile service provider server to detect a message recipient's email address.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A system for sending short text messages from a mobile communication network providing an SMS service to at least one first mobile phone to a different or identical mobile communication network providing the SMS service to at least one second mobile phone, which comprises:

- at least one base station for providing wireless network nodes of the first and second mobile phones;
- a short message service center for receiving a short message from the first mobile phone and sending the received short message to both the second mobile phone and an email address of a subscriber having the second mobile phone, if the email address is included in the received short message; and
- at least one mobile switching center for delivering a request for sending a short message which has been received from the first mobile phone to the short message service center and sending the short message to the second mobile phone upon receiving an instruction from the short message service center to send the short message.

2. The system as claimed in claim 1, wherein said short message includes a destination address field with a telephone number of the second mobile phone, a destination sub-address field with an email address of the second mobile phone subscriber and a message content field.

3. The system as claimed in claim 1, wherein said short message service center sends the short message to a mail server so that the short message can be delivered to said email address.

4. In a mobile communication system for sending short text messages from a mobile communication network providing an SMS service to at least one first mobile phone to a different or identical mobile communication network providing the SMS service to at least one second mobile phone, a device for sending a short message on said first mobile phone, comprising:

- a message input section for inputting a short text message including a telephone number of the second mobile phone and an email address of a subscriber having the second mobile phone;
- an encoder for encoding the inputted short message in an SMS format; and
- a control section for controlling the message input section to input the short message and for controlling the encoder to encode the inputted short message in the SMS format and for sending the encoded short message to a short message service center.

5. The device as claimed in claim 4, wherein said short message includes a destination address field with a telephone number of the second mobile phone, a destination sub-address field with an email address of the second mobile phone subscriber and a message content field.

6. In a method for sending short text messages from a mobile communication network providing an SMS service to at least one first mobile phone to a different or identical mobile communication network providing the SMS service to at least one second mobile phone in a mobile communication system, a process of sending a short message from the first mobile phone comprising:

- when a menu for simultaneous SMS and email services is selected on the first mobile phone, inputting a short message including a telephone number of the second mobile phone and an email address of a subscriber having the second mobile phone;
- encoding the inputted short message in an SMS format; and
- sending the encoded short message to a short message service center.

7. The process as claimed in claim 6, wherein said short message includes a destination address field with a telephone number of the second mobile phone, a destination sub-address field with an email address of the second mobile phone subscriber and a message content field.

8. In a method for sending short text messages from a mobile communication network providing an SMS service to at least one first mobile phone to a different or identical mobile communication network providing the SMS service to at least one second mobile phone in a mobile communication system, a process of delivering a short message from a short message service center comprising:

- when the short message service center receives a short message from the first mobile phone, searching a header of the received short message;
- determining whether the header includes an email address of a subscriber having the second mobile phone; and
- when the header includes an email address, sending the short message to both the second mobile phone and the email address included in the header.

9. The process as claimed in claim 8, wherein said short message includes a destination address field with a telephone number of the second mobile phone, a destination sub-address field with an email address of the second mobile phone subscriber and a message content field.

* * * * *